United States Patent Office 3,439,249
Patented Apr. 15, 1969

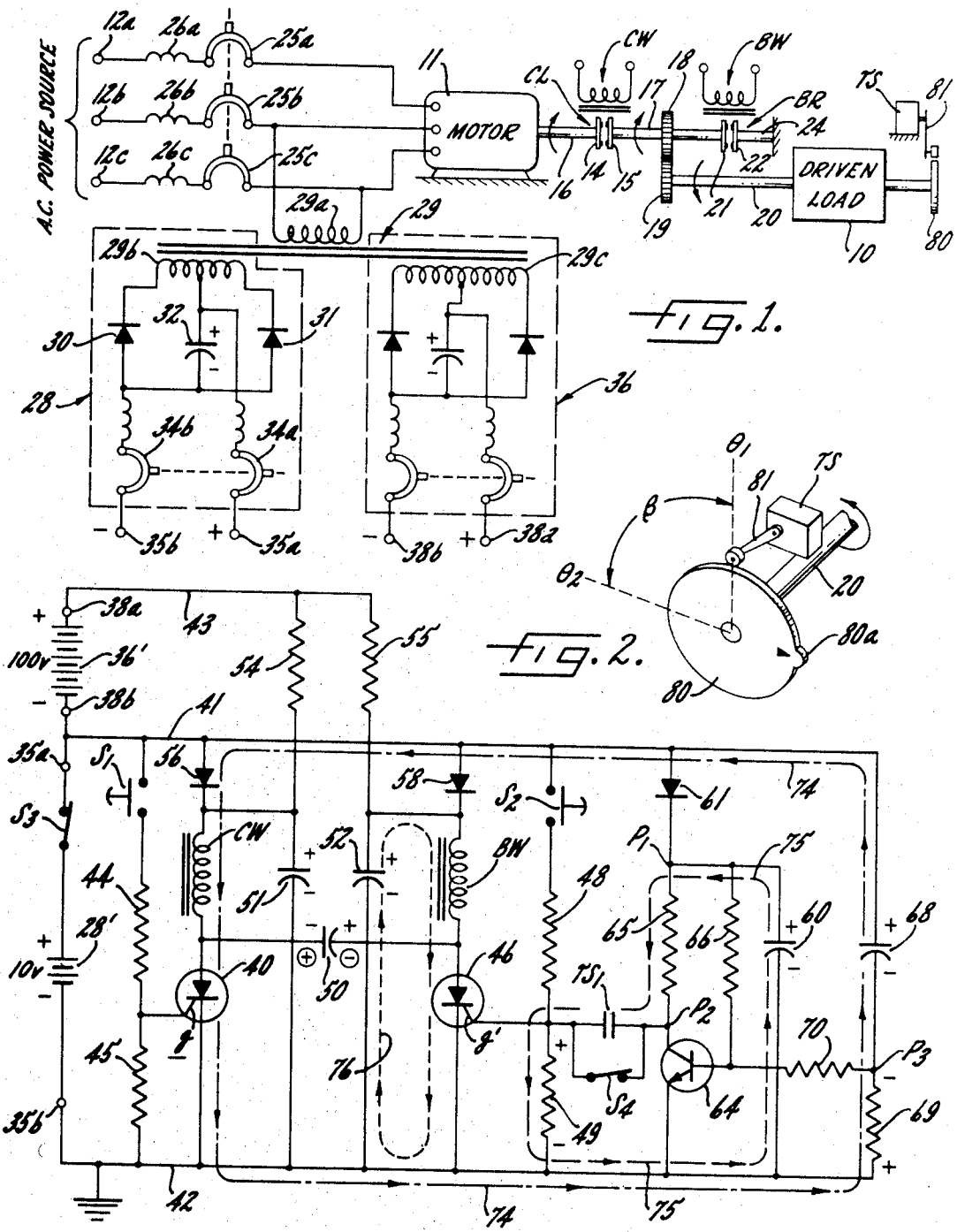

3,439,249
CONTROL FOR ACTUATING AN ELECTRIC BRAKE TO STOP A DRIVEN LOAD UPON LOSS OF ELECTRICAL POWER
Roger C. Brendemuehl, Beloit, Wis., assignor to Warner Electric Brake & Clutch Company, South Beloit, Ill., a corporation of Delaware
Filed Jan. 16, 1967, Ser. No. 609,647
Int. Cl. H02p 3/06
U.S. Cl. 318—368    17 Claims

ABSTRACT OF THE DISCLOSURE

In a system where a load is driven by electrical power means, failure of the electrical power supply may permit the load to coast undesirably, and such failure removes the normal supply voltage for energizing an electric brake and for operating associated control circuitry. In the present system, energy is stored in a capacitor which can be discharged through an SCR to energize the electric brake even though the source voltage is absent. The SCR is triggered to initiate such discharge by current stored in a second capacitor and controlled by a transistor which is responsive to the presence or absence of the normal source voltage, such transistor automatically causing discharge of the second capacitor and the application of a triggering signal to the SCR whenever the source voltage disappears.

---

The present invention relates in general to systems for driving a load or load shaft from power means, and in particular to the stopping of the load or load shaft whenever there is an accidental or intentional removal of the electrical source voltage from the power means and associated control circuits. More specifically, the invention pertains to an arrangement for automatically engaging an electric brake to stop a driven load in response to the disappearance of a source voltage.

It is the principal objective of the instant invention to stop a driven load quickly and automatically whenever a power failure occurs, and despite the fact that the normal supply voltage for exciting an electric brake, and for operating control means to initiate such excitation, is no longer available after such power failure.

A related and more specific object of the invention is to achieve the foregoing without in any way adversely affecting the normal controlled starting and stopping of a driven load so long as there is no power failure.

Still another object of the invention is to provide such a system in which the driven load will aways be brought to a stop in substantially the same position in the event of a power failure.

It is a concurrent object to accomplish automatic stopping of a load in response to a power failure without resort to a "fail safe" type of brake (e.g., spring engaged, electrically released), and without requiring bulky, expensive, and relatively unreliable voltage-sensitive relays and relay contacts.

And an additional object of the invention is to provide such a simple and reliable power failure system for stopping a driven load that it may in fact be used affirmatively to stop the load by intentionally disconnecting the system from the electrical voltage source.

Stated briefly, and in exemplary concrete terms, a power failure-responsive system according to the present invention comprises electrically-operated power means for driving a load together with electrically excitable brake means for stopping the load. When the power means is activated from an electrical source, the brake means are deenergized and released. If there is a failure of the electrical power supply, however, so that the power means is deactivated and the load tends to coast, the disappearance of a normal source voltage from voltage supply lines is sensed by a control device such as a transistor, and the latter permits a previously charged capacitor to discharge in a manner to create an enabling voltage pulse. Such pulse is utilized to initiate the flow of exciting current from a stored source through the winding of an electromagnetic brake which then engages and stops the load. In the preferred form of the invention, the excitation of the brake winding is timed to occur at the instant the load passes a predetermined first position, so that with the known travel during braking, the load comes to a stop substantially at a predetermined second position.

Other objects and advantages, and the structural organization of the invention, will become apparent from the following detailed description, taken in conjunction with the accompanying drawings, in which:

FIGURE 1 is a simplified, diagrammatic illustration of a typical power means for driving a load which is assocated with an electromagnetic brake, and such figure also illustrates exemplary DC power supplies which may be used to create the operating voltages for control circuits;

FIG. 2 is a fragmentary, diagrammatic illustration of a timing switch and an associated actuating cam carried by the load shaft;

FIG. 3 is a schematic circuit diagram of a preferred embodiment of control apparatus for selectively exciting the brake and clutch coils shown in FIG. 1, such apparatus including the power failure brake-actuation feature of the present invention;

Figure 4:
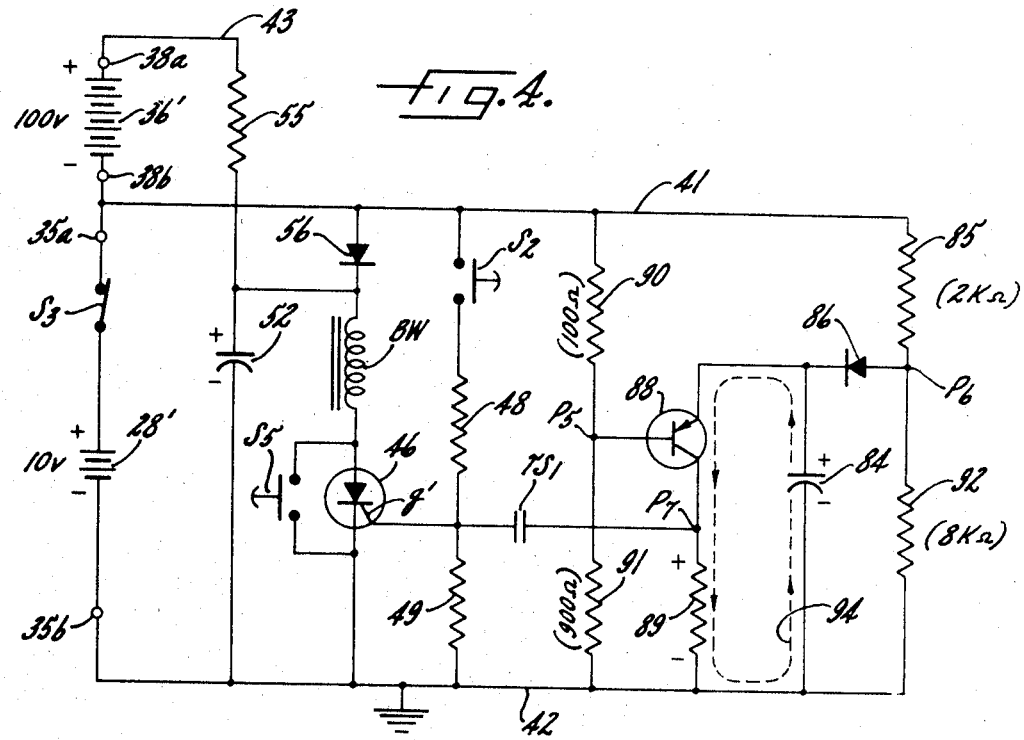
FIG. 4 is a schematic circuit diagram of a modified embodiment of such control apparatus.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defied by the appended claims.

*The environment of and introduction to the invention*

As a way of making clear one environment in which the invention will find advantageous use, FIG. 1 illustrates in very diagrammatic form power means for driving a load 10 together with braking means selectively engageable to stop the load. As here illustrated, the power means take the form of a three-phase induction motor 11 energized from a three-phase alternating voltage power source at terminals 12a, 12b, 12c to run continuously, together with an electromagnetic clutch CL having selectively engageable mating elements 14, 15 respectively carried by the motor output shaft 16 and an intermediate shaft 17. When an inductive winding CW associated with the clutch CL is excited by current flow therethrough, the normally disengaged elements 14, 15 are brought into driving engagement, so that the motor 11 drives a gear 18 fast on the shaft 17 and meshed with a gear 19 carried by a load shaft 20 coupled to the driven load 10. Thus, with the motor energized and the clutch winding CW excited, the power means continuously drives the load 10.

In many applications it may be desirable to brake the load to a stop and hold it against rotation. For this purpose, the intermediate shaft 17 carries one element 21 of an electromagnetic brake BR whose other element 22 is fixed to a stationary part 24. The brake elements 21, 22 are normally released and rotatable relative to one another, but when exciting current is applied through an associated inductive winding BW, these elements are brought into frictional engagement, thereby braking the load 10 to a stop.

The particular structural organizations of the clutch CL and the brake BR do not per se form a part of the present invention, and any of a wide variety of well known clutches and brakes may be employed. It will suffice simply to note that in order to drive the load 10 from the continuously running motor 11, the clutch CL is engaged and the brake BR is released. To stop the load 10, the clutch CL is released, and the brake BR is engaged. Thus, it may be said that the clutch and brake are selectively and complementally actuated in order to drive or stop the load 10. Such selective and complemental control of the brake and clutch is accomplished by the control apparatus to be described below with reference to FIG. 3.

As noted above, if the motor 11 is continuously energized and running, the power means may be rendered active or inactive merely by energizing or deenergizing the clutch winding CW. If the load is being driven and the clutch winding CW is deenergized without energization of the brake winding BW, then the driven load would simply coast until it ultimately slowed to a stop. It should be noted, however, that the power means may be activated or deactivated by energizing or deenergizing the motor 11, and this may be accomplished by affirmatively and intentionally tripping circuit breaker contacts 25a, 25b, 25c connected in series between the power source terminals 12a–c and the motor leads. Alternatively, the motor 11 may be deenergized, and the power means thus deactivated, as a result of the contacts 25a–c tripping open due to current overloads sensed by windings 26a, 26b, 26c in series between the AC source terminals 12a–c and the motor 11. Such tripping of the circuit breaker contacts is considered as a power failure, since it will result from overload currents, and it serves to remove the power source voltage from the power means constituted in part by the motor 11. Thus, insofar as the present invention is concerned, the clutch CL may be omitted, and the motor 11 itself may serve as a controllable power means for driving the load 10, the motor being activated by closure of the contacts 25a–c, and deactivated by either intentional or accidental opening of those circuit breaker contacts. For completeness in the following description, however, the control system to be described with reference to FIG. 3 has been shown as including the clutch winding CW and means for selectively energizing it.

In order to selectively energize the brake winding BW (and also the clutch winding CW), a DC source voltage is preferred. Such source voltage may be provided by any suitable one of a variety of DC power supplies well known in the art. For purposes of discussion, however, a full wave rectifier type of DC power supply 28 is here illustrated in FIG. 1, comprising a transformer 29 having a primary winding 29a connected across two of the motor leads so as normally to be excited through the breaker contacts 25b, 25c from one phase of the three-phase AC power source. The transformer 29 includes a center tapped secondary winding 29b having its opposite extremities connected through similarly poled rectifying diodes 30, 31 to one side of a smoothing capacitor 32 which has its opposite plate connected to the center tap. In this conventional rectifying circuit, the capacitor 32 is charged to a DC voltage of the indicated polarity. The contacts 34a, 34b of a thermal overload circuit breaker are connected from the opposite sides of a capacitor 32 to output terminals 35a, 35b and between which there appears a DC source voltage here assumed by way of example to be 10 volts with the indicated polarity.

For a purpose to be explained below, it is desirable although not essential to utilize a second, higher DC source voltage in order to overcome time delays resulting from the inductance of the windings CW and BW, and thereby to speed up engagement of the clutch CL and the brake BR. Such a higher DC source voltage may be created by a second rectifying power supply 36 which includes a secondary winding 29c in the transformer 29 and which otherwise is similar to the power supply 28. It may be assumed for purposes of discussion that the power supply 36 has output terminals 38a, 38b between which there appears a DC source voltage of 100 volts in magnitude and of the indicated polarity.

*Description of first embodiment*

The control circuitry shown in FIG. 3 enables the selective and complemental excitation of the clutch and brake windings BW and CW so that the load may be selectively driven or stopped under normal conditions when the electric power for the system remains continuously available. In this respect, the exemplary control circuit of FIG. 3 is similar to that disclosed and claimed in applicant's copending application Ser. No. 585,577, filed Oct. 10, 1966, and assigned to the assignee of the present application. Briefly stated, the inductive clutch winding CW is connected in series with a triggered electronic valve here shown as a silicon controlled rectifier (SCR) 40 between first and second voltage supply lines 41, 42 which are connected normally to receive a suitable DC source voltage therebetween. The terminals 35a, 35b of the DC power supply 28 (FIG. 1) may be connected to the supply lines 41, 42, but for simplicity in FIG. 3, the voltage supply 28 has been shown as a 10 volt battery 28' making the supply line 41 10 volts positive relative to the supply line 42, the latter being considered as residing at reference or ground potential. With this arrangement, the SCR 40 may be triggered into its conductive state by momentary closure of a start switch S1, thereby connecting a voltage divider formed by resistors 44, 45 across the voltage supply lines 41, 42. The gate $g$ of the SCR is connected to the junction between the resistors 44, 45 so that even momentary closure of the switch S1 creates a voltage pulse across the latter resistor making the gate $g$ positive relative to the SCR cathode, thereby triggering the SCR into its conductive state. As is well known, once the SCR has been triggered into conduction, it will continue to conduct current with negligible voltage drop across its anode-cathode path even though the enabling gate signal is removed, and until the anode-cathode potential is reduced to zero or reversed in polarity.

In similar fashion, the inductive brake winding BW is connected in series with a triggered electronic valve here shown as an SCR 46 between the voltage supply lines 41, 42 having a 10 volt source voltage normally appearing between them. The SCR 46 may be triggered into its conductive state so as to energize the brake winding BW by momentary closure of a stop switch S2 which connects a voltage divider formed by resistors 48, 49 between the supply lines 41, 42. The gate $g'$ of the SCR 46 is connected to the junction of the resistors 48, 49 so that even momentary closure of the switch S2 produces a voltage pulse across the resistor 49, making the gate $g'$ positive with respect to the cathode of the SCR. Once the SCR 46 has been so triggered into its conductive state, it will remain conductive until its anode-cathode voltage is reduced to zero or reversed in polarity.

In order to make the SCR 40 to turn off whenever the SCR 46 is triggered into conduction, and vice versa, a switching capacitor 50 is connected between their two anodes. Assuming that the SCR 40 is conducting and the winding CW is excited, the potential at the anode of the SCR 46 will be more positive than that at the anode of the SCR 40, and the capacitor 50 will thus be charged with a polarity indicated by the uncircled symbols in FIG. 3. If now the stop switch S2 is momentarily closed to trigger the SCR 46 into its conductive state, the potential at the anode of the latter will drop abruptly due to current flow through the winding BW and the voltage drop thereacross. Because the capacitor 50 cannot discharge immediately, this drop in potential at the anode of the SCR 46 makes the potential at the anode of the SCR 40 swing negative with respect to the ground supply line 42, thereby reversing the anode-cathode polarity of the SCR 40 and causing the latter to turn off.

Conversely, the same sort of operation occurs when the SCR 46 is conducting and the SCR 40 is non-conducting. Under these conditions, the capacitor 50 will be charged with a voltage of the polarity indicated by the circled symbols in FIG. 3, so that momentary closure of the start switch S1 and triggering of the SCR 40 into conduction will result in turn off of the SCR 46. It will be apparent, therefore, that so long as the 10 volt source voltage appears between the supply lines 41, 42, the brake BR may be disengaged and the clutch CL engaged simply as a result of momentarily closing the start switch S1, to produce rotational drive of the load 10 (FIG. 1). The system will remain in this condition until the stop switch S2 is momentarily closed and, in consequence, the clutch CL is disengaged and the brake BR is engaged so as to bring the load 10 to a stop. The brake BR will remain engaged to hold the load 10 stationary until the start switch S1 is again depressed.

As explained more fully in the above-identified copending application, the source voltage provided between the supply lines 41, 42 is usually chosen in magnitude so that it produces a rated steady state current through the winding CW or BW which can be safety carried without overheating or burning out those windings. But in order to overcome the delays in establishing rated current through the inductive windings when they are first excited, and to increase the speed with which the brake or the clutch is engaged, provision is made to supply a temporary over-voltage to each inductive winding immediately after its corresponding SCR is triggered. For this purpose, relatively large capacitors 51 and 52 are respectively connected in parallel across the series combinations of (a) the winding CW and the SCR 40, and (b) the winding BW and the SCR 46. These capacitors are connected to be charged from a relatively high voltage source of poor regulation, shown for simplicity in FIG. 3 as a battery 36' associated with resistors 54 and 55. The battery 36' corresponds to and represents the high voltage power supply 36 described above in connection with FIG. 1. In effect, the two DC power supplies represented at 28' and 36' are connected in series between a high voltage supply line 43 and the ground or reference supply line 42. Thus, the capacitors 51 and 52 may charge to a potential of 110 volts by current flow from the line 43 through the respective resistors 54, 55 to the supply line 42.

When the SCR 46 is non-conductive, the capacitor 52 will thus be charged to a relatively high voltage of the indicated polarity by current flow through the resistor 55. Then, when the SCR 46 is next triggered into conduction, substantially the full 110 volts from the capacitor 52 will be applied across the brake winding BW so exciting current through that winding will build up very rapidly and the brake will be engaged without an undue time delay. As the capacitor 52 discharges, however, the voltage across it will exponentially decay in a relatively short time to a lower value of about 10 volts. Thereafter, steady state current of the safe, rated value will flow from line 41 through the diode 58, the winding BW, and the SCR 46 to the line 42, thereby keeping the brake engaged. Very little steady state current is drawn from the battery 36' because a small trickle current through the resistor 55 creates a 100 volt drop across the latter. The capacitor 52 will not recharge until the SCR 46 is subsequently turned off to deenergize the brake winding BW. It may be said that the capacitor 52 when charged serves as a source of stored current, and that capacitor is chosen in size to store sufficient energy to bring to load 10 to a stop before all of its stored energy is dissipated.

The capacitor 51 serves the same function but with respect to the clutch winding CW. When the SCR 40 is non-conductive, the capacitor 51 will charge with the indicated polarity to about 110 volts by current flow through the resistor 54. When the start switch S1 is momentarily closed to trigger the SCR 40 into conduction (and to cut off the SCR 46), the capacitor 51 will apply a temporary over-voltage to the winding CW and exciting current through the latter will thus increase rapidly to quickly engage the clutch CL as a voltage across the capacitor exponentially decays. By the time the voltage across the capacitor 51 has been reduced to about 10 volts, the clutch CL will be fully engaged, and it will be held in such engagement by a steady state current flow from the supply line 41 through a diode 56, the winding CW and the SCR 40. Very little current will be supplied from the high voltage source 36' through the clutch winding CW after the capacitor 51 is discharged, because a small trickle current through the resistor 54 will create a voltage drop of approximately 100 volts across the latter. The unidirectionally conductive diodes 56 and 58 connected with the polarity shown in series respectively with the brake windings CW and BW prevent the high voltage source 36' from being shunted by the resistors 54 and 55, and prevent discharge of the capacitors 51 and 52 through the battery 28'.

Assume that the system as thus far described is operating to drive the load 10, i.e., that the SCRs 40 and 46 are respectively conductive and non-conductive so that the clutch CL and brake BR are respectively engaged and disengaged. If now the source voltage is accidentally or intentionally removed from the supply lines 41, 42 the exciting current through the clutch winding will terminate, the clutch CL will be disengaged, but the brake winding BW will remain deenergized because the SCR 46 is in its non-conductive state. With the power means for driving the load thus deactivated, the load 10 will coast to an uncontrolled stop at an indeterminate position. Such coasting and uncontrolled stopping of the driven load is undesired and in fact intolerable in many applications because it may result in damage to working mechanisms or devices which form a part of or are associated with the load.

This condition of uncontrolled coasting and stopping as a result of loss of the source voltage might arise in a number of ways. First, if overload currents are drawn by the motor 11 and the breaker contacts 25a–c trip open (or if the breaker contacts are intentionally opened by an operating technician), the motor 11 will of course be deenergized and the load will coast, but the DC source voltages produced by the powder supplies 28 and 36 will also disappear because the transformer primary winding 29a will be deenergized. Thus, the clutch CL will also be disengaged, so that both the motor 11 and the load 10 will independently coast. Secondly, the same result will obtain if the three-phase AC power source at terminals 12a–c fails due to interruption of service from the electric utility system to which those terminals are connected. Thirdly, if the controlled circuitry connected to the power supply terminals 35a, 35b in FIG. 1 malfunctions and draws excessive current so that the thermal overload contacts 34a, 34b trip open (or if the contacts 34a, 34b are intentionally opened by an operating attendant), the source voltage applied to lines 41, 42 in FIG. 3 will disappear, and the clutch CL will be disengaged. Although the motor 11 under these circumstances would continue running, the load 10 would coast to an uncontrolled stop.

For purposes of the present description, any of these conditions may be considered as a power failure and its occurrence may be equated to the opening of a normally closed switch S3 shown in FIG. 3 as connected in series with the battery 28'. If the switch S3 is opened either accidentally as a result of an overload or intentionally by a technician who wishes to shut down the system, the source voltage between lines 41, 42 will disappear. Thus, the current through the clutch winding CW will terminate, but the brake winding BW will remain deenergized, and the load will coast.

In accordance with the present invention such uncontrolled coasting and stopping of the load as a result of a power failure is eliminated, and instead the brake winding BW is exicited to engage the brake BR automatically whenever the source voltage disappears from the supply lines 41, 42. Thus, as soon as there is a power failure which deactivates the load driving power means, the brake BR is engaged to bring the load 10 promptly to a stop.

To achieve this, a stored current source is provided together with control means responsive to an enabling signal for passing exciting current from the source through the brake winding even though the normal source voltage has disappeared. Such stored current source in the present instance is constituted by the capacitor 52 and the means previously described for charging that capacitor; and the SCR 46 serves as a control means responsive to an enabling signal in the form of a positive voltage applied to the gate g'. In the present environment, the SCR 46 serves for normal control of the excitation of the brake winding BW, as explained above, and the capacitor 52 fortuitously serves also to produce rapid excitation of the brake winding BW during normal stopping operations in response to actuation of the stop switch S2, as previously described. However, separate components may be employed solely for the power failure-responsive function to be described.

Further in accordance with the invention, means are provided which are responsive to the presence or absence of the source voltage for supplying an enabling signal to initiate discharge of the stored current source through the brake winding BW whenever the source voltage disappears from the lines 41, 42. For this purpose, a second capacitor is associated with means to charge the same when and so long as the source voltage is present between the supply lines 41, 42. Only after and as a result of the disappearance of the source voltage, the potential of the charged second capacitor is utilized to create an enabling signal which initiates excitation of the brake winding from the stored current source.

In the embodiment illustrated by FIG. 3, such a second capacitor 60 is shown connected through a diode 61 between the supply lines 41, 42 so that it will be charged with the indicated polarity when and so long as the 10 volt source voltage from the battery 28' is present. As a means responsive to the voltage across the charged capacitor 60 for applying an enabling signal to the SCR 46, the upper plate of that capacitor is connected through a resistor 65 and normally closed switch contacts S4 to the gate g', and absent the inhibiting action to be described, the capacitor voltage would make the gate g' positive with respect to its cathode, thereby turning on the SCR 46. But additional means are employed to inhibit the operation of the signal applying means so long as the source voltage is present between the supply lines 41, 42. In the exemplary arrangement shown by FIG. 3, a controllable device having first and second states of conductivity, here a transistor 64, is associated with the resistor 65 to isolate the gate g' from or to connect it with the capacitor 60 depending upon whether the source voltage is present or absent between the lines 41, 42. More particularly, the resistor 65 is connected as a load resistor in series with the emitter-collector path of the transistor 64 through the diode 61 and between the lines 41, 42. The load resistor 65 and transistor 64 are thus connected in parallel with the capacitor 60, with the emitter of the transistor being connected directly to the reference or ground line 42. A biasing resistor 66 connected from the line 41 through the diode 61 to the base of the transistor 64 produces current flow forwardly through the base-emitter junction so that the transistor is held in a first state, i.e., turned fully on, and conducts current through the load resistor 65 and its collector-emitter path so long as the source voltage exists between the two supply lines. In consequence, the upper terminal P1 of the load resistor 65 resides at a potential of approximately +10 volts, but the voltage drop due to current flow through the load resistor makes its lower terminal P2 reside at a potential substantially equal to the line 42 or only slightly positive with respect thereto. The terminal P2 is connected by means here shown as the normally closed switch S4 to the gate g' of the SCR 46, but the very small potential which normally exists at the point P2 is insufficient to trigger the SCR into conduction. Thus, so long as the source voltage is present between the supply lines 41, 42 and the transistor 64 is held in its first or "turned on" state, the connection from point P2 to the gate g', cannot result in triggering of the SCR 46. Under these conditions, the capacitor 60 remains charged to a voltage of substantially 10 volts.

In order to place the transistor 64 in its second or non-conductive state, and thus to prevent discharge of the capacitor 60 through that transistor when the source volage disappears, means are provided to reversely bias its base-emitter junction in response to such source voltage disappearance. This is accomplished by a capacitor 68 and a resistor 69 connected in series between the supply lines 41, 42 so that the source voltage when present will charge the capacitor with the indicated polarity. The junction P3 between the capacitor 68 and the resistor 69 is connected through a current limiting resistor 70 to the base of the transistor 64. Under normal conditions with the supply voltage present, current flowing through the resistor 66 and the base-emitter junction will result in a large voltage drop across the latter resistor, so that the base of the transistor resides at or very slightly above zero volts potential. Moreover, once the capacitor 68 has been charged, substantially no current flows through the resistor 69, so the junction P3 resides at or very slightly above zero volts potential.

The operation of this control circuit when the source voltage is removed from lines 41, 42 (for example, by opening the switch S3) may now be described. When the source voltage disappears, the voltage across capacitor 60 tends to maintain current flow through the resistor 66 and the base-emitter junction of the transistor 64, so that the latter tends to remain conductive, and thus the capacitor 60 tends to discharge by current flow through resistor 65 and the transistor 64. However, this tendency is overcome because as soon as the source voltage disappears, the capacitor 68 begins discharging by current flow through the clutch winding CW and the SCR 40 before the latter turns off, such discharge current path being shown by the dot-dash line 74 in FIG. 3. The diode 61 prevents the capacitor 60 from discharging through the clutch winding CW and the SCR 40. The current resulting from the discharge of the capacitor 68 persists for a considerable time interval, and it creates a voltage drop of the indicated polarity across the resistor 69. This makes the junction P3 negative in potential, and in turn makes the base of the transistor 64 negative in potential so that the transistor is rendered non-conductive. As a result, the capacitor 60 does not discharge through the transistor 64, but on the contrary, it discharges by current flow around the path shown by the dashed line 75, i.e., through the load resistor 65, the closed switch S4, and the resistor 49 which is connected across the gate and cathode of the SCR 46. Thus, the discharge current from the capacitor 60 results in a voltage pulse of the indicated polarity across the resistor 49, making the gate g' positive with respect to its cathode, and triggering the SCR 46 into its conductive state. In other words, with the transistor 64 in its second or non-conductive state, the isolation of the capacitor 60 is removed, and the voltage across the capacitor produces an enabling signal at the gate g'. It will be understood that the resistor 49 need not actually be present, and the discharge current from the capacitor 60 may flow from the gate g' to its associated cathode. In any event, triggering of the SCR 46 permits the previously charged capacitor 52 to discharge through the brake winding BW by current flow around the path indicated by the dotted line 76. The resulting excitation of the brake winding BW is sufficiently great in magnitude and duration to engage the brake and bring the load 10 to a stop.

Thus, despite the fact that the disappearance of the source voltage removes the normal source of exciting current for the brake winding BW, the storage capacitor 52 supplies enough current to excite the brake winding and to engage the brake winding to stop the load. And, despite the fact that the disappearance of the source voltage removes any normal source for providing a triggering signal to the SCR 46, the capacitor 60 serves to supply that signal after, and only after, the source voltage disappears. The transistor 64 controlled so as to be conductive in the presence of the source voltage, and non-conductive for a period (during which the capacitor 68 discharges) immediately after disappearance of the source voltage serves effectively to cause the capacitor 60 to supply a triggering signal to the gate $g'$ only after the source voltage disappears.

In some applications it is important to bring the load to rest in a particular position whenever it is braked after a power failure. For example, if the driven load 10 is the shuttle mechanism of a textile loom, and if the load shaft is stopped in some angular position which leaves the shuttle outside the box at the end of its path of oscillatory travel, the shuttle may break a large number of warp threads. This would require laborious and time-consuming retying of the broken threads before the operation of the loom could be resumed. A power failure accompanied by stoppage of the shuttle at some position other than "in the box" is thus to be avoided.

The power failure-responsive brake system of the present invention may, in one of its forms, serve always to stop the load and the load shaft in a particular position. To effect this, switching means are employed to signal those instants at which the load passes through a first predetermined angular position, and such signalling is utilized to determine the instant at which the brake winding is excited after a power failure occurs. Although such switching means may take a variety of forms such as a transistor triggered by a magnetic pickup associated with the load shaft, FIGS. 1 and 2 show a simple cam 80 formed with a single lobe 80a and fixed to the load shaft 20 adjacent the actuating arm 81 of a timing switch TS. During each revolution of the shaft 20, the cam lobe 80a will deflect the arm of the switch TS (and thereby close normally open switch contacts TS1 shown in FIG. 3) at the instant that the load shaft is passing through a first predetermined angular position designated $\theta_1$ in FIG. 2. If the desired stopping position for the load shaft 20 is that in which the cam lobe 80a lies at an angular position $\theta_2$, then the first position $\theta_1$ at which the switch TS is mounted is chosen to lead the second position $\theta_2$ by an angle $\beta$. The angle $\beta$ is the angle through which the load shaft 20 will turn before stopping after the brake winding BW is excited. The angle $\beta$ will be different in different particular installations, depending upon the speed with which the load is driven by the power means, the inertia of the load and rotating parts, and the torque characteristics of the particular electromagnetic brake which is employed. However, it is a simple matter to determine how far the load shaft will turn before stopping after the brake winding is excited, and it is only necessary to mount the timing switch TS at a first predetermined position $\theta_1$ which is in advance of the desired stopping position $\theta_2$ by this determined angle $\beta$.

The normally open contacts TS1 (FIG. 3) of the timing switch are interposed between the point P2 and the gate $g'$ in lieu of the direct connection which has here been represented by the closed switch S4. This may be done simply by opening the switch S4 as illustrated in FIG. 3, so that the connection is established only at those instants when the load shaft is passing through the first position $\theta_1$ and the contacts TS1 are closed.

With this modification, the circuitry of FIG. 3 will operate in substantially the same manner previously described. That is, so long as the source voltage is present between the supply lines 41, 42, repeated closing of the contacts TS1 during successive revolutions of the load shaft will not cause firing of the SCR 46 because the junction P2 resides substantially at the potential of the ground line 42. As soon as the source voltage disappears, however, the capacitor 68 will begin discharging and the transistor 64 will be cut off. Yet, no triggering signal will be applied to the SCR 46 if the contacts TS1 are open. Rather, only when the coasting load shaft 20 next reaches the first predetermined position $\theta_1$, and the contacts TS1 next momentarily close, the capacitor 60 will discharge by current flow through the path 75, and a triggering pulse will be applied to the gate $g'$ to fire the SCR 46. Thus, the capacitor 52 will discharge to energize the brake winding BW. In this way, the energization of the brake winding is timed so that it is initiated when the load shaft is passing through a first predetermined position, and so that the load shaft is stopped, after braking, substantially in the desired, second predetermined position.

It may be noted that the contacts TS1 will reopen almost immediately after the capacitor 60 has produced a short pulse of discharging current therethrough. This, however, is of no consequence since a momentary positive pulse between the gate and cathode of the SCR 46 will render the latter conductive, and it will remain conductive until the capacitor 52 is substantially fully discharged.

*Description of second embodiment*

The invention as described with reference to the exemplary and preferred embodiment of FIG. 3 may be practiced in a number of different specific embodiments. A second embodiment is illustrated in FIG. 4, wherein like components are designated by the same reference characters employed in FIG. 3. This second embodiment will be described only to the extent of noting the particulars in which it differs from the first embodiment. For the sake of simplicity, the clutch winding CW and the circuit components directly associated therewith have been omitted from FIG. 4, and it will be assumed that in normal starting and stopping operations a normally open switch S5 will be momentarily closed to shunt the anode-cathode path of the SCR 46, and thus to turn the latter off, each time that the power means are activated to drive the load. Similarly, each time the stop switch S2 is momentarily closed to cause engagement of the brake, means (not shown) associated with that switch operate to deactivate the power means driving the load.

In order to energize the brake winding BW and stop the load automatically in response to a power failure, the capacitor 52 in FIG. 4 serves as a source of stored current, as previously explained. A second capacitor 84 is arranged to be charged when the source voltage is present between the supply lines 41, 42, and for this purpose that capacitor is connected in series with a resistor 85 and a diode 86 between the two supply lines.

To isolate the capacitor 84 from the gate $g'$ so long as the source voltage is present, a controllable conductivity device in the form of a PNP transistor 88 is connected in series with a load resistor 89 across the capacitor 84. The transistor 88 is controlled in a manner such that it is (a) placed in a first state, i.e., cut off so long as the source voltage is present, and (b) placed in a second state, i.e., turned on immediately after the source voltage disappears.

To hold the transistor 88 cut off when the source voltage is present, its base is connected to the junction P5 of a voltage divider formed by resistors 90, 91 connected between the supply lines and sized so that the junction resides at a potential of about +9 volts. The resistor 85, on the other hand, is connected in series with a second resistor 92 between the supply lines, so as to form a voltage divider which makes its junction P6 normally reside at a potential of about +8 volts. Thus, whenever the source voltage is present, the emitter of the transistor 88 is at a potential of about +8 volts, and its base is at a potential of about +9 volts. In this way, the emitter-base junction of the transistor is reversely biased, current flow through the emitter-collector path is precluded, and substantially no voltage drop appears across the load resistor 89. Yet, under these circumstances the capacitor 84 remains charged to a voltage of about 8 volts. And, as the timing switch contacts TS1 repeatedly close and connect the upper terminal P7 of the load resistor 89 to the gate $g'$, the SCR 46 will not be fired because the terminal P7 resides substantially at the same potential as the supply line 42.

If now the source voltage disappears from between the supply lines 41, 42 (e.g., if switch S3 is opened), the points P5 and P6 will both tend to drop to zero volts potential relative to ground. The capacitor 84 cannot discharge through the resistor 92 because the diode 86 prevents current flow in that direction. But the capacitor does serve by discharging to create a small current flow through the emitter-base junction of the transistor 88 and through the resistor 91. Thus, the emitter-base junction of the transistor 88 is forwardly biased, and its emitter-collector path becomes fully conductive. As a result, the transistor 88 no longer inhibits the application of an enabling signal from the capacitor 84 to the gate $g'$, and indeed the transistor permits the capacitor to discharge by current flow directly through the transistor 88, such discharge current flowing around a path represented by the dotted line 94 in FIG. 4. The discharging of the capacitor 84 therefore creates a voltage drop of the indicated polarity across the load resistor 89, making the terminal P7 positive relative to the line 42. When the timing switch contacts TS1 next close, the gate $g'$ is made positive with respect to its cathode, and the SCR 46 is triggered into conduction. The capacitor 52 will thus discharge through the brake winding BW and cause engagement of the brake BR so that the load shaft is brought to a stop.

It should be understood that a direct connection may be made between the terminal P7 and the gate $g'$ in lieu of the contacts TS1 shown in FIG. 4, so that the brake winding BW is excited just as soon as the source voltage disappears and the transistor 88 is turned on. However, where stoppage of the load shaft in a particular position is desired, the use of the timing switch and its contacts TS1 will produce this desired result, it being necessary only to choose the time constant of the discharge path for the capacitor 84 so that a voltage drop persists across the load resistor 89 for a time interval equal to that required for the load shaft to make one revolution at the speed it has when the power means are deenergized.

*Description of third embodiment*

Figure 5:
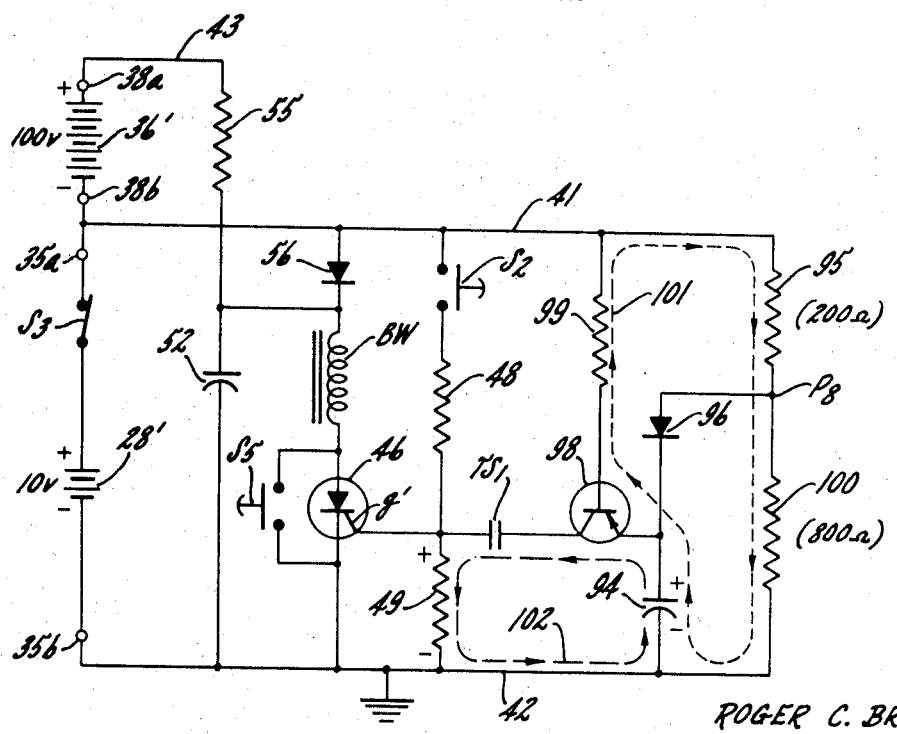
FIG. 5 is similar to FIG. 4, but illustrates still another embodiment of the invention.

FIG. 5 shows a third embodiment of the present invention, and it will be described brefly to note the differences in organization and operation as compared to the embodiment of FIG. 4. In FIG. 5, a second capacitor 94 is connected through a resistor 95 and a diode 96 so as to be charged with the indicated polarity whenever the source voltage is present between the supply lines 41, 42. In this embodiment, however, the capacitor itself is connected to the gate $g'$ of the SCR 46 through a controlled PNP transistor 98 and the timing switch contacts TS1. Thus, when the transistor is non-conductive, it inhibits the transfer of an enabling pulse from the capacitor 94 to the gate $g'$. The transistor 98 is controlled in a manner such that it is held in a first state, i.e., turned off when the source voltage is present, but placed in a second state, i.e., turned on, during a period immediately after the source voltage disappears.

To provide such control of the transistor 98, its base is connected through a resistor 99 to the supply line 41 and thus resides at a +10 volt potential when the source voltage is present. The resistor 95 is connected in series with a second resistor 100 between the voltage supply lines to form a voltage divider having a junction P8 which will reside at a potential of about +8 volts when the source voltage is present. Thus, with the source voltage present, the capacitor 94 is charged to about 8 volts, and the emitter of the transistor 98 resides at a +8 volt potential because it is connected directly to the upper terminal of the capacitor 94. Since the base of the transistor resides at a +10 volt potential, the transistor is cut off, and no current can flow through the emitter-collector path of the transistor even though the timing switch contacts TS1 are periodically closing. Thus, with the source voltage present and the capacitor 94 charged, triggering of the SCR 46 is inhibited.

On the other hand, as soon as the source voltage disappears from between the lines 41 and 42, the capacitor 94 cannot discharge through the diode 96 and the resistor 100. But the voltage across capacitor 94 produces a small discharging current through the emitter-base junction of the transistor 98, the resistor 99, the resistor 95, and the resistor 100, such current following a path indicated by the dotted line 101 in FIG. 5. This forward bias of the emitter-base junction renders the transistor 98 conductive, so that the capacitor 94 may produce a main discharging current which follows the path indicated by the dashed line 102 in FIG. 5. However, this main discharge current of the capacitor 94 will not occur until the next instant at which the timing contacts TS1 momentarily close, and such discharge will create a positive voltage pulse across the resistor 49 and between the gate $g'$ and cathode of the SCR 46. Therefore, in response to a power failure and the disappearance of the source voltage, the transistor 98 will be rendered conductive, and the SCR 46 will be turned on at the instant when the timing switch contacts TS1 next close, so that the current storing capacitor 52 will discharge through the brake winding BW to engage the brake BR and bring the load shaft 20 to a stop substantially at the desired position $\theta_2$ (FIG. 2). Of course, if stopping of the load shaft in a particular position is not required, the timing switch contacts TS1 may be replaced by a direct connection between the collector of the transistor 98 and the gate $g'$ in FIG. 5. It will be understood, of course, that the resistor 49 is not essential, and it may be omitted so that the discharge current from the capacitor 94 passes directly through tthe gate-cathode path of the SCR 46.

From the foregoing descriptions of exemplary embodiments, it will now be apparent that the present invention brings to the art a very simple system for automatically engaging an electric brake whenever there is a power failure which otherwise would permit a driven load to coast to an uncontrolled stop. The present system requires no relays or relay contacts, and it will function reliably to stop a driven load immediately upon the occurrence of a power failure. In a preferred form, the invention may be readily utilized to stop a driven load in a particular position each time a power failure occurs. Moreover, because of the simplicity and reliability of the present control system, it may not only be employed to stop a driven load when an accidental and unintended power failure occurs, but it may also be used for intentional stopping of the load in response to an affirmative act of disconnecting the power source from the electrically energized power means.

I claim as my invention:

1. In a system having power means for driving a load, a brake selectively engageable to stop the load, said brake having a winding and means responsive to excitation thereof for engaging the brake, first and second voltage supply lines normally receiving a DC source voltage therebetween, means by which said power means are deactivated when the source voltage is accidentally or intentionally removed from said supply lines, a source of stored current, and control means responsive to an enabling voltage for passing exciting current from said source through said brake winding, the improvement which comprises, in combination, a capacitor, first means for causing said capacitor to be charged from said supply lines when and so long as said source voltage is present between such lines, second means responsive to the voltage across said charged capacitor for applying an enabling voltage to said control means, and third means for inhibiting the operation of said last-named means so long as the source voltage is present between said supply lines, whereby the persisting charge on said capacitor after disappearance of the source voltage causes said second means to enable said control means, thereby to engage said brake.

2. The apparatus defined by claim 1, further characterized in that said second means includes a switching means operative only at instants the load is passing through a predetermined first position, so that the enabling signal reaches said control means only at such instants.

3. The apparatus defined by claim 1, further characterized in that said second means includes means to discharge said capacitor when not inhibited by said third means, and means for deriving said enabling signal from the current flow which results from the discharge of the capacitor.

4. In a system having power means for driving a load, a brake selectively engageable to stop the load, said brake having a winding and means responsive to excitation thereof for engaging the brake, first and second voltage supply lines normally receiving a DC source voltage therebetween, means by which said power means are deactivated when the source voltage is accidentally or intentionally removed from said supply lines, a source of stored current, and control means responsive to an enabling signal for passing exciting current from said source through said brake winding, the improvement which compreses, in combination, a capacitor, means for causing said capacitor to be charged from said supply lines when and so long as said source voltage is present between such lines, a controllable device having first and second states of conductivity, means for placing said device in its first or second state in response to the presence or absence, respectively, of the source voltage between said supply lines, and means rendered effective only when said device is in its second state for coupling said charged capacitor to supply an enabling signal to said control means, thereby to engage said brake whenever the source voltage disappears from between said lines.

5. The combination set forth in claim 4, further characterized in that said last-named coupling means includes means for creating a discharge current path for discharging said capacitor only when said device is in its second state, and means for deriving an enabling signal from the current flow which results from the discharge of said capacitor.

6. The combination set forth in claim 4, further characterized in that said last-named coupling means includes switching means permitting said enabling signal to reach said control means at an instant the load is passing through a predetermined position and said device is in its second state, so that the load is stopped substantially in a predetermined second position.

7. In a system having power means for driving a load, means for normally activating said power means, a brake selectively engageable to stop the load when the power means are deactivated, said brake having a winding and means responsive to excitation thereof for engaging the brake, first and second voltage supply lines normally receiving a DC source voltage, means for deactivating said power means whenever the source voltage is removed from said supply lines, a triggered electronic valve connected in series with said winding between said lines, means for rendering said valve non-conductive when said power means is activated, a first capacitor connected in parallel across the series combination of said winding and valve, and means to charge said first capacitor while said valve is non-conductive and with a voltage polarity such that the capacitor will discharge through the winding and the valve when the latter is made conductive, the improvement which comprises, in combination, a second capacitor, first means connecting said second capacitor to be charged from said supply lines when and so long as said source voltage is present between such lines, second means for coupling the voltage across said capacitor as a triggering signal to said electronic valve, and said second means including third means for preventing the triggering signal from reaching said valve until concurrently (a) the source voltage is absent between said supply lines and (b) the driven load is passing through a predetermined position.

8. In a system having power means for driving a load, a brake selectively engageable to stop the load when the power means is turned off, said brake having a winding and means responsive to excitation thereof for engaging the brake, first and second voltage supply lines normally connected to a DC source voltage, said power means being associated with said supply lines in a manner such that the removal of said voltage turns off the power means, a triggered electronic valve connected in series with said winding between said lines, means for rendering said valve non-conductive when said power means is turned on, a first capacitor connected in parallel across the series combination of said winding and valve, and means for charging said first capacitor while said valve is non-conductive, the improvement which comprises, in combination, a second capacitor, first means connecting said second capacitor to be charged from said supply lines when and so long as the source voltage is present, second means responsive to the voltage across said second capacitor for supplying a triggering signal to said electronic valve, and third means for inhibiting the operation of said second means unless and until said source voltage is removed from said supply lines, whereby said electronic valve is made conductive to excite said winding by discharge of said first capacitor to brake the load to a stop whenever said power means is turned off due to accidental or intentional removal of the source voltage.

9. The combination set forth in claim 8, further characterized in that said third means includes means for also inhibiting operation of said second means unless and until the load is passing through a predetermined first position, thereby to assure that the load is braked to a stop substantially at a second predetermined position.

10. In a system having power means for rotationally driving a load shaft, means for normally energizing said power means, a brake selectively engageable to stop the load shaft when the power means are deenergized, said brake including a winding and means responsive to excitation thereof for engaging the brake, first and second voltage supply lines normally receiving a DC source voltage, means for deenergizing said power means whenever the source voltage is accidentally or intentionally removed from said supply lines, a triggered electronic valve connected in series with said winding between said supply lines, means for rendering said valve non-conductive when said power means is energized, a first capacitor connected in parallel across the series combination of said winding and valve, means for charging said first capacitor when said valve is non-conductive and with a voltage polarity such that discharge of the capacitor excites said winding when said valve is triggered into conduction, the improvement which comprises, in combination, a second capacitor, means connecting said second capacitor to be charged from said supply lines when and so long as said source voltage is present between such lines, switching means rendered conductive only at instants said load shaft is passing through a first predetermined angular position, means connecting said switching means to supply a triggering signal from said charged second capacitor to said electronic valve when the switching means is conductive, and said last-named means including a transistor, means for controlling the conduction of said transistor according to the presence or absence of the source voltage between said supply lines, and means formed at least in part by said transistor to inhibit the application of a triggering signal to said valve so long as the source voltage is present between said supply lines.

11. The combination set forth in claim 10, further characterized by means constituted in part by said transistor for permitting said second capacitor to discharge after the source voltage is removed from said supply lines, and means for converting the discharge current from said second capacitor into a triggering signal.

12. In a system having power means for driving a load, means for normally activating said power means, a brake engageable to stop the load when the power means are deactivated, said brake including a winding and means responsive to excitation thereof to engage the brake, first and second voltage supply lines normally receiving a DC source voltage therebetween, and means for deactivating said power means when the source voltage is accidentally or intentionally removed from said supply lines, the improvement which comprises, in combination, means including a transistor having its emitter-collector path connected in series with a load resistor between said supply lines for creating a junction whose potential is substantially equal to or different from that of the second line when the transistor is conductive or non-conductive, respectively, a capacitor connected in parallel across said transistor and load resistor so that it will be charged when the source voltage is present between said lines, circuit means connected with the base of said transistor for rendering the latter conductive when the source voltage is present between said lines, thereby to create a voltage drop across said load resistor, means responsive to the removal of the source voltage from said lines for rendering said transistor non-conductive, thereby to prevent discharge of said capacitor through said transistor, a stored current source, and means responsive to said junction residing at a potential substantially different from that of said second line for exciting said brake winding from said stored current source.

13. The combination set forth in claim 12, further characterized in that said means for rendering said capacitor non-conductive includes a second capacitor, means for charging said second capacitor from said supply lines when the source voltage is present, means for discharging said second capacitor when the source voltage is removed from between said lines, and means responsive to the discharge current from said second capacitor for reversely biasing the emitter-base junction of said transistor, thereby to render the transistor non-conductive 14. The combination set forth in claim 12, further characterized by normally open switch contacts, means for closing said contacts at instants said load passes through a first predetermined position, and means connecting said contacts between said junction and the exciting means last-named in claim 12.

15. In a system having power means for driving a load, means for normally activating said power means, a brake engageable to stop the load when the power means are deactivated, said brake having a winding and means responsive to excitation thereof to engage the brake, first and second voltage supply lines normally receiving a DC source voltage therebetween, means for deactivating said power means when the source voltage is accidentally or intentionally removed from said supply lines, and a stored current source, the improvement which comprises, in combination, a capacitor, circuit means connected to said supply lines for charging said capacitor to a first voltage less than said source voltage, a transistor having an emitter, base and collector, means connecting the emitter-collector path of said transistor in series with a load resistor across said capacitor, means including a voltage divider connected between said lines for applying a potential to said base to hold said transistor non-conductive when the source voltage is present between said lines, whereby upon removal of the source voltage said transistor is rendered conductive to create a voltage drop across said load resistor due to discharge of said capacitor, and means responsive to the presence of said voltage drop for initiating excitation of said winding from said stored current source.

16. In a system having power means for driving a load, means for normally activating said power means, a brake engageable to stop the load, said brake having a winding and means responsive to excitation thereof to engage the brake, first and second voltage supply lines normally receiving a DC source voltage therebetween, means for deactivating said power means when the source voltage is accidentally or intentionally removed from said supply lines, and a source of stored current, the improvement comprising, in combination, a capacitor, first and second resistors connected in the order named between said first and second supply lines to form a voltage divider, means connecting said capacitor across said second resistor so that the capacitor charges to a potential less than said source voltage when the source voltage is present, a transistor having an emitter, base and collector, said emitter being connected to said capacitor and said base being connected to said first supply line so that the emitter-base junction is reversely biased when the source voltage is present, and so that upon removal of the source voltage from said lines, the voltage across said capacitor forwardly biases said emitter-base junction, means connected in series with said capacitor and the emitter-collector path of said transistor and responsive to current flow therethrough for exciting said brake winding from said stored current source.

17. The combination set forth in claim 16, further characterized in that said last-named means includes a switching device rendered conductive at instants when said load passes through a predetermined position.

References Cited

UNITED STATES PATENTS

| | | | |
|---|---|---|---|
| 2,666,176 | 1/1954 | Faith | 318—368 |
| 2,973,467 | 2/1961 | Choudhury et al. | 318—368 |

ORIS L. RADER, *Primary Examiner.*

K. L. CROSSON, *Assistant Examiner.*

U.S. Cl. X.R.

318—372